US012670207B2

(12) United States Patent　　　　(10) Patent No.:　US 12,670,207 B2
Chung et al.　　　　　　　　　　　(45) Date of Patent:　Jun. 30, 2026

(54) APPARATUS AND METHOD FOR REASONING MUSIC BASED ON BRAIN COMPUTER INTERFACE

(71) Applicant: Seoul National University R&DB Foundation, Seoul (KR)

(72) Inventors: Chun Kee Chung, Seoul (KR); June Sic Kim, Seoul (KR); You Min Shin, Seoul (KR); Ji I Kwon, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/928,692

(22) PCT Filed: Nov. 2, 2022

(86) PCT No.: PCT/KR2022/017035
§ 371 (c)(1),
(2) Date: Nov. 26, 2024

(87) PCT Pub. No.: WO2023/182604
PCT Pub. Date: Sep. 28, 2023

(65) Prior Publication Data
US 2025/0086226 A1　　Mar. 13, 2025

(30) Foreign Application Priority Data

Mar. 24, 2022　(KR) ........................ 10-2022-0036838

(51) Int. Cl.
*G06F 16/60*　　　(2019.01)
*G06F 16/635*　　(2019.01)

(52) U.S. Cl.
CPC ................................. *G06F 16/636* (2019.01)

(58) Field of Classification Search
CPC ...................................................... G06F 16/636
See application file for complete search history.

(56) References Cited

FOREIGN PATENT DOCUMENTS

| CN | 105824888 | A | * | 8/2016 | .......... | G06F 16/636 |
|----|-----------|---|---|--------|-----------|-------------|
| CN | 107515925 | A | * | 12/2017 | .......... | G06F 16/636 |
| KR | 10-2004-0070145 | | | 8/2004 | | |
| KR | 10-2007-0031180 | | | 3/2007 | | |
| KR | 10-2018-0036503 | | | 4/2018 | | |
| KR | 10-2021-0034459 | A | | 3/2021 | | |
| KR | 20210034459 | A | * | 3/2021 | ............. | A61B 5/372 |
| TW | 1731676 | B | * | 6/2021 | | |

OTHER PUBLICATIONS

KIPO, A PCT Search Report of PCT/KR2022/017035 dated Feb. 8, 2023.

(Continued)

*Primary Examiner* — Kristopher Andersen
(74) *Attorney, Agent, or Firm* — NSIP Law

(57) ABSTRACT

A BCI-based music inferring method according to an embodiment of the present disclosure is a BCI-based music inferring method in which at least part of each operation is performed by a processor, and includes receiving brain signal data of a subject imagining a melody, and estimating a melodic contour of the melody on the basis of the brain signal data.

18 Claims, 13 Drawing Sheets

(56)                   References Cited

OTHER PUBLICATIONS

Miranda, Eduardo Reck. "Brain-computer music interface for composition and performance." International Journal on Disability and Human Development 5.2 (Apr. 2006): 61-67.
Goldstein, Rachel, et al. "MindMusic: Brain-Controlled Musical Improvisation." Computer Science and Engineering Senior Theses. 144. Santa Clara University (Jun. 7, 2019): 1-29.
Sung-Hwan Chun et al., "A Study on Generating Interactive Sound Contents by Electroencephalogram", Proceedings of the Korea Information Processing Society Conference. Korea Information Processing Society, Apr. 2016. (Translate only abstracts).

* cited by examiner

FIG. 12

A  2-Beat (inter-beat latency: 500 ms)

Pre-stimulation section: 10 sec
(virtual time point for further analysis)

Stimulation section: 234 sec

Post-stimulation section: 10 sec
(virtual time point for further analysis)

B  3-Beat (inter-beat latency: 700 ms)

Pre-stimulation section: 84 sec
(virtual time point for further analysis)

Stimulation section: 325.5 sec

Post-stimulation section: 168 sec
(virtual time point for further analysis)

Sound amplitude [dB]

C

| 2-Beat Stimulus | Num |
|---|---|
| All stimuli presented | 194 |
| No down-beat | 19 |
| No up-beat | 20 |

D

| 3-Beat Stimulus | Num |
|---|---|
| All stimuli presented | 110 |
| No down-beat | 15 |
| No middle-beat | 15 |
| No up-beat | 15 |

| BPM Meter | 105 | 110 | 115 | 120 | 125 | 130 |
|---|---|---|---|---|---|---|
| 2/2 | 5 | 6 | 7 | 1 | 3 | 5 |
| 2/4 | 5 | 4 | 1 | 2 | 5 | 8 |
| 2/8 | 9 | 1 | 3 | 6 | 7 | 5 |
| 3/2 | 8 | 1 | 4 | 5 | 6 | 9 |
| 3/4 | 8 | 4 | 4 | 4 | 2 | 8 |
| 4/2 | 4 | 6 | 9 | 7 | 8 | 10 |
| 4/4 | 5 | 3 | 6 | 4 | 7 | 8 |

APPARATUS AND METHOD FOR REASONING MUSIC BASED ON BRAIN COMPUTER INTERFACE

TECHNICAL FIELD

The present disclosure relates to an apparatus and a method for inferring music on the basis of a brain-computer interface (BCI) and, more particularly, to an apparatus and a method for inferring music on the basis of a melody imagined by a subject or a base meter recognized from a brainwave of the subject.

BACKGROUND ART

A brain-computer interface (BCI) is a technique for controlling a device or determining a user's intention or emotion by using a brain signal, which is for recognizing the user's intention mainly on the basis of a brain signal generated by an electrical activity of a brain.

Conventionally, the BCI has been studied mostly in the medical field to recognize the intention of physically disabled or paralyzed patients, and is being studied to be applied to various fields, for example, normal people's control of peripheral devices, such as a game. Among BCI operating methods, an intrinsic method is a method for determining an intention by analyzing brainwaves induced by a user's imagination without any external stimulus.

Related art 1 of producing music on the basis of brainwaves of a subject has been recently disclosed. Related art 1 discloses a technique of setting a list of mapping pitch onto each frequency of the subject's brainwave in advance, determining the frequency of a measured brainwave, and producing pitch and notes on the basis of the list. However, related art 1 simply determines pre-mapped pitch and notes for the frequency of the measured brainwave, and does not disclose a configuration for determining the characteristics of music imagined by the subject. In addition, related art 1 does not disclose the basis on which the preset relationship between pitch and each mapped frequency of a brainwave is derived.

DISCLOSURE OF INVENTION

Technical Problem

An embodiment of the present disclosure provides an apparatus and a method for inferring music similar to an imagined melody on the basis of a brainwave.

Another embodiment of the present disclosure provides an apparatus and a method for estimating a melodic contour of an imagined melody on the basis of a brainwave.

Still another embodiment of the present disclosure provides an apparatus and a method for determining a beat and a meter of an imagined melody on the basis of a brainwave.

Solution to Problem

A BCI-based music inferring method according to an embodiment of the present disclosure is a BCI-based music search method in which at least part of each operation is performed by a processor, and includes receiving brain signal data of a subject imagining a melody and estimating a melodic contour of the melody on the basis of the partial brain signal data.

A BCI-based music inferring method according to another embodiment of the present disclosure is a method in which at least part of each operation is performed by a processor, and includes receiving brain signal data of a subject and determining base meter information from the brain signal data.

A BCI-based music inferring apparatus according to an embodiment of the present disclosure includes a processor, and a memory configured to be electrically connected to the processor and to store at least one code performed by the processor, wherein the memory is configured to store a code which, when executed by the processor, causes the processor to receive brain signal data of a subject imagining a melody and to estimate a melodic contour of the melody on the basis of brain signal data.

Advantageous Effects of Invention

A BCI-based music search apparatus and a BCI-based music search method according to an embodiment of the present disclosure may retrieve music in a mood similar to an imagined melody only in response to a subject's imagination.

A BCI-based music search apparatus and a BCI-based music search method according to an embodiment of the present disclosure may provide an easy music search environment by estimating a melodic contour, beat, and meter of a melody imagined by a subject.

A BCI-based music search apparatus and a BCI-based music search method according to an embodiment of the present disclosure may provide an easy music search environment for physically challenged people.

BRIEF DESCRIPTION OF DRAWINGS

FIG. 12 illustrates an experimental environment and stimulus patterns for identifying a meter state of a subject according to an embodiment of the present disclosure.

BEST MODE FOR CARRYING OUT THE INVENTION

Figure 1:
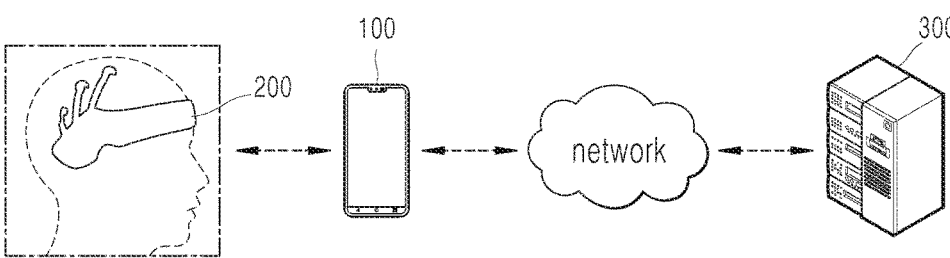
FIG. 1 illustrates an environment for implementing a BCI-based music search method or for driving a BCI-based music search apparatus according to an embodiment of the present disclosure.

Hereinafter, embodiments in the disclosed specification will be described in detail with reference to the accompanying drawings, and the same or similar elements are given the same or similar reference numerals, so duplicate descriptions thereof will be omitted. The terms "module" and "unit" used for the elements in the following description are given or interchangeably used in consideration of only the ease of writing the specification, and do not have distinct meanings roles by themselves. In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

An environment for implementing a brain-computer interface (BCI)-based music search method or a BCI-based music search apparatus according to an embodiment of the present disclosure is described with reference to FIG. 1.

The environment for implementing the BCI-based music search apparatus or the BCI-based music search apparatus method according to the embodiment of the present disclosure may include a BCI-based music search apparatus 100 and a brain signal measurement device 200.

The brain signal measurement apparatus 200 may measure a brain signal, such as a brainwave, from a subject. When the brainwave is an electroencephalogram (EEG), the brain signal may be received from an electrode cap in which a plurality of electrodes is regularly disposed at positions spaced at regular intervals on an elastic cap according to the international 10-20 system or a plurality of electrodes disposed on the head of the subject according to the international 10-20 system. The international 10-20 system is an international standard for the placement of electrodes attached or bonded to the scalp, and determines a system of lines for the placement of electrodes by using the distance between bone marks on a head. The electrodes for measuring a brain signal may be disposed at intervals of 10% or 20% of the total length of the lines. Alternatively, the brain signal may be measured and provided to according an electrode placement system similar to the international 10-20 system or an electrode placement system for some positions required according to the purpose. Therefore, the brain signal measurement apparatus 200 is not limited to measuring the brainwave on the basis of the international 10-20 system.

Although a brain signal is described with reference to an electroencephalogram for illustration in this specification, a brain signal is a concept including both electrical and magnetic signals generated from a nerve cell of the brain, such as a magnetoencephalogram (MEG), an electrocorticogram (ECOG), or an event-related potential (ERP) including P300, and an image obtained by photographing the brain.

The brain signal measurement apparatus 200 may be configured as being included in the BCI-based music search apparatus 100, or may be configured separately from the BCI-based music search apparatus 100. When the brain signal measurement apparatus 200 is configured separately from the BCI-based music search apparatus 100, the BCI-based music search apparatus 100 may receive a brain signal measured by a plurality of electrodes mounted on a subject from the brain signal measurement device 200 through a network or a wired/wireless interface.

In another embodiment, the brain signal measured by the brain signal measurement apparatus 200 is a concept including the form of an image. For example, the brain signal may be EEG topography generated based on an EEG. In the present specification, a brain signal is a concept including not only electrical and magnetic signals generated from a nerve cell of the brain, such as a magnetoencephalogram (MEG) and an electrocorticogram (ECOG), but also topography generated on the basis of the electrical and magnetic signals.

In another embodiment, the brain signal may be a brain image obtained by photographing the brain for a predetermined time, such as fMRI.

Brain signal data is spontaneous potential signal data obtained by performing AD conversion, baseline correction, trend removal, or filter processing on a measured brain signal, such as an EEG, or may be evoked potential (EP) or ERP signal data obtained by artifact removal, segmentation, or averaging.

The BCI-based music search apparatus 100 may receive brain signal data of a subject imagining a melody through the brain signal measurement apparatus 200 or the network.

The BCI-based music search apparatus 100 may process the brain signal data to estimate a melodic contour of the melody imagined by the subject, and may retrieve music similar to the melody imagined by the subject on the basis of the melodic contour. The similar music refers to music having a musical similarity in a melodic contour, a meter, and a music genre.

In an embodiment, the BCI-based music search apparatus 100 may transmit meter information including the melodic contour, a beat, or a meter of the melody imagined by the subject estimated on the basis of the brain signal data to the search apparatus 300 to request retrieval of music similar to the melody imagined by the subject, and may be provided with a search result.

In another embodiment, the BCI-based music search apparatus 100 may perform comparison with a database stored in a storage unit on the basis of the meter information including the melodic contour, the beat, or the meter of the melody imagined by the subject estimated on the basis of the brain signal data, thereby retrieving music similar to the melody imagined by the subject.

Therefore, the present disclosure includes all of an embodiment in which the BCI-based music search apparatus 100 performs a search for music similar to the melody imagined by the subject or an embodiment in which an apparatus (the search apparatus 300) separate from the BCI-based music search apparatus 100 provides a search result.

Figure 2:
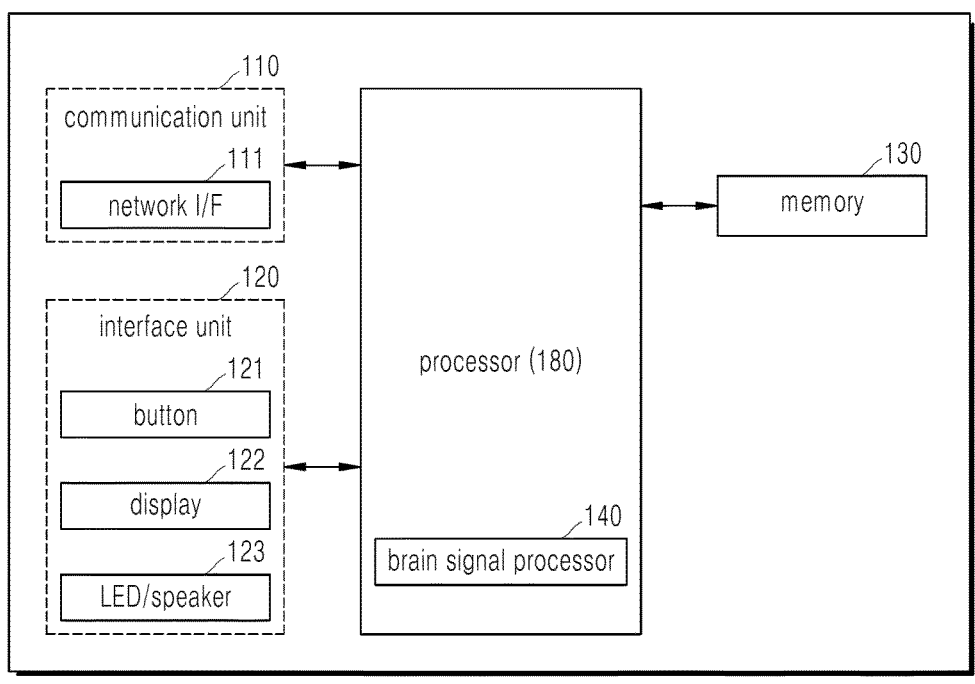
FIG. 2 is a block diagram illustrating a configuration of a BCI-based music search apparatus according to an embodiment of the present disclosure.

A configuration of the BCI-based music search apparatus 100 according to an embodiment of the present disclosure is described with reference to FIG. 2. Although a description with reference to FIG. 2 is made with reference to the BCI-based music search apparatus 100, the search apparatus 300 may also include the same or similar configuration.

The BCI-based music search apparatus 100 may include a communication unit 110 to interface or communicate with the brain signal measurement apparatus 200 or electrodes for measuring a brain signal, and the communication unit 110 include may a mobile communication module, a wireless Internet module, and a short-range communication module as a network interface 111.

The BCI-based music search apparatus 100 may transmit the melodic contour of an imagined melody or other musical information to the search apparatus 300 through the communication unit 110, and may receive retrieved music or a retrieved result. As described above, the BCI-based music search apparatus 100 may be configured in the same apparatus as the search apparatus 300.

The mobile communication module transmits and receives a wireless signal to and from at least one of a base station, an external terminal, and a server on a mobile communication network established according to technical standards or communication methods for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long-Term Evolution (LTE), and Long-Term Evolution-Advanced (LTE-A)) used in the mobile communication module.

The wireless Internet module refers to a module for wireless Internet access, and may be built in the BCI-based music search apparatus 100 or be provided outside the BCI-based music search apparatus 100. The wireless Internet module is configured to transmit and receive a wireless signal in a communication network according to wireless Internet technologies.

The wireless Internet technologies may include, for example, a wireless LAN (WLAN), Wireless Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long-Term Evolution (LTE), and Long-Term Evolution-Advanced (LTE-A).

The short-range communication module is for short-range communication, and may support short-range communication by using at least one of Bluetooth™, Radio Frequency Identification (RFID), Infrared Data Association (IrDA), Ultra-Wideband (UWB), ZigBee, Near Field Communication (NFC), Wireless Fidelity (Wi-Fi), Wi-Fi Direct, and Wireless Universal Serial Bus W (ireless USB).

The BCI-based music search apparatus 100 may include an interface unit 120 to provide a user input or a notification to a user, and the interface unit 120 may include a button 121, a display 122, an optical output module, such as an LED, or an audio output module 123, such as a speaker. The interface unit 120 may include a mechanical input device (or a mechanical key, a dome switch, a jog wheel, a jog switch, or the like) and a touch input device. For example, the touch input device may include a virtual key, a soft key, or a visual key displayed on a touch screen through software processing, or may include a touch key disposed on a part other than the touch screen.

The BCI-based music search apparatus 100 may include a memory 130, and the memory 130 may store brain signal data transmitted from the brain signal measurement apparatus 200 or measured from a subject.

In an embodiment, the memory 130 of the BCI-based music search apparatus 100 may store a trained learning model or optimized model parameters of an artificial neural network included in the trained learning model.

In another embodiment, when the configuration illustrated in FIG. 2 is used as a training device that trains a learning model for estimating the melodic contour of an imagined melody on the basis of brain signal data, the memory 130 may store training data and a code for training a machine learning-based learning model.

The BCI-based music search apparatus 100 may use a processor 180 to infer a result value by applying the trained learning model to a specific input. In another embodiment, when the configuration illustrated in FIG. 2 is a training device that trains a learning model of brain signal data, the processor r 180 may be used to train the machine learning-based learning model. The processor 180 may repeatedly train the artificial neural network by using various learning techniques, thereby determining the optimized model parameters of the artificial neural network, or may infer a result value by applying the learning model to an input according to a model parameter of the trained artificial neural network.

The BCI-based music search apparatus 100 may include a brain signal processor 140 that performs pre-processing of a brain signal, and the brain signal processor 140 may be configured as a of the processor 180 or may be configured separately. In an embodiment, the brain signal processor 140 may be configured as a DSP chip or a GPU.

In an embodiment, when a brain signal is an electroencephalogram, the brain signal processor 140 may perform amplification and filtering, and remove noise, or artifacts. Alternatively, the brain signal processor 140 may perform algorithms, such as Fourier analysis and wavelet analysis. The brain signal processor 140 is a general component to those having ordinary skill in the art, and thus a detailed description thereof will be omitted herein.

When a brain signal is a brain image, the brain signal processor 140 may pre-process the brain image through an image processing algorithm.

In an embodiment, the processor 180 may include the brain signal processor 140 to estimate a melodic contour by processing brain signal data on the basis of deep learning or inputting data into a learning model, and the brain signal processor 140 may be a processor specialized in artificial neural network processing or a core processor. The core processor may be a core existing inside the processor 180. Alternatively, the brain signal processor 140 may be a neural processor dedicated to an artificial neural network that exists separately from a general-purpose processor.

The BCI-based music search apparatus 100 includes the processor 180 that is caused by the code stored in the memory 130 to estimate a musical characteristic of a melody imagined by a subject on the basis of a brain signal of the subject. The musical characteristic of the melody includes a melodic contour, a beat or meter, a genre, a rhythm, and the like. The processor 180 may determine the musical characteristic of the melody by inputting brain signal data based on the brain signal into the machine learning-based learning model or on the basis of signal processing of the brain signal data.

In another embodiment, when the BCI-based music search apparatus 100 trains the machine learning-based learning model, the BCI-based music search apparatus 100 includes the processor 180 that is caused to train the machine learning-based learning model that estimates the melodic contour of a melody on the basis of partial brain signal data, on the basis of the code and the training data stored in the memory 130.

In an embodiment, the BCI-based music search apparatus 100 may include a communication interface for performing communication with the brain signal measurement apparatus 200 or the search apparatus 300.

The communication interface may include a wireless communication unit or a wired communication unit.

The wireless communication unit may include at least one of a mobile communication module, a wireless Internet module, a short-range communication module, and a location information module.

The mobile communication module transmits and receives a wireless signal to and from at least one of a base station, an external terminal, and a server on a mobile communication network established according to Long-Term Evolution (LTE), which is a communication method for mobile communication.

The wireless Internet module is a module for wireless Internet access, may be built in the BCI-based music search apparatus 100 or be provided outside the BCI-based music search apparatus 100, and may employ a wireless LAN (WLAN), Wireless Fidelity (Wi-Fi), Wireless Fidelity (Wi-Fi) Direct, Digital Living Network Alliance (DLNA), and the like.

The short-distance communication module is a module for data transmission and reception through short-range communication, and may employ Bluetooth™, Radio Frequency Identification (RFID), Infrared Data Association (IrDA), Ultra-Wideband (UWB), ZigBee, Near Field Communication (NFC), and the like.

The location information module is a module for obtaining the location of the BCI-based music search device 100, and may be a Global Positioning System (GPS) module based on satellite navigation technology or a module for obtaining a location on the basis of wireless communication with a wireless communication base station or a wireless access point. The location information module may include a Wi-Fi module.

In an embodiment, the BCI-based music search apparatus 100 may include an input unit for a user's input or an output unit.

The input unit includes a microphone and a user interface (UI) including a touch interface for receiving information from a user, and the user interface may include not only a mouse and a keyboard but also a mechanical or electronic interface configured in the apparatus and is not particularly limited in method and type as long as enabling the user to input a command. The electronic interface includes a display capable of a touch input.

The output unit is for externally expressing an output of the BCI-based music search device 100, thus delivering information to the user, and may include a display, an LED, a speaker, and the like for expressing a visual output, an auditory output, or a tactile output.

The BCI-based music search apparatus 100 may include peripheral device interface unit for data transmission with various types of connected external devices, and may include a memory card port, an external device input/output (I/O) port, and the like.

Figure 3:
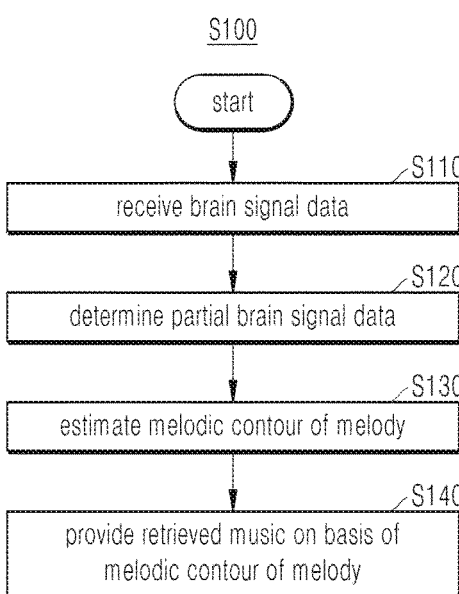
FIG. 3 is a flowchart illustrating a BCI-based music search method according to an embodiment of the present disclosure.

A BCI-based music search method of the BCI-based music search apparatus 100 according to an embodiment of the present disclosure is described with reference to FIG. 3.

Figure 4:
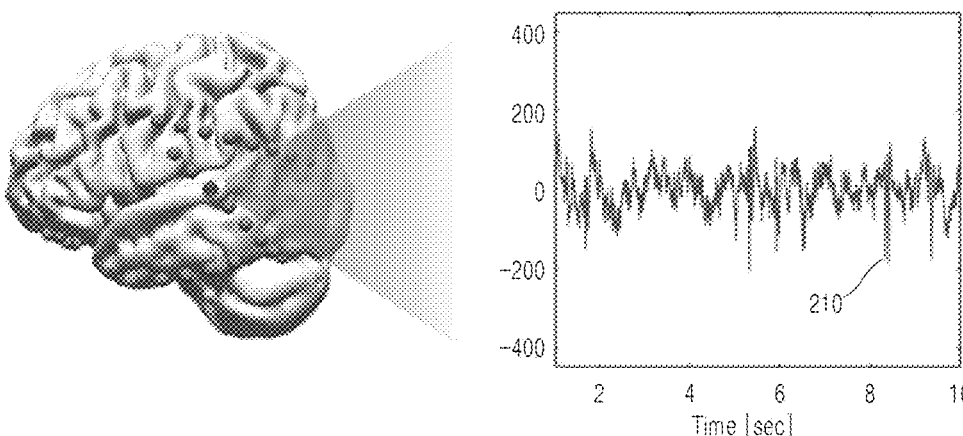
FIG. 4 illustrates brain signal data according to an embodiment of the present disclosure.

The BCI-based music search apparatus 100 may receive brain signal data 210 as shown in FIG. 4 from the brain signal measurement apparatus 200 (S110), or may obtain brain signal data 210 by receiving a brain signal from a brain signal measurement electrode disposed on a head part of a subject and pre-processing the brain signal. Alternatively, the BCI-based music search apparatus 100 may obtain brain signal data 210 by loading the brain signal data 210 from a storage device. The brain signal may be a signal obtained by measuring electrical and magnetic signals generated from nerve cells of a brain, such as an electroencephalogram or a magnetoencephalogram, or may be a topography generated on the basis of the electrical and magnetic signals, such as the electroencephalogram or the magnetoencephalogram. Alternatively, the brain signal may be a brain image obtained by photographing the brain with a diagnostic imaging device, such as CT, MRI, or fMRI.

When the brain signal is the electroencephalogram, the brain signal may be an electrical signal measured in a plurality of electrodes disposed on the head part of the subject according to the international 10-20 system.

The brain signal data 210 may be data obtained by processing a brain signal measured from the subject imagining a melody, or may be data obtained by processing a brain signal measured from the subject without imagining a melody. The BCI-based music search apparatus 100 may display an interface for requesting a user to select whether to perform a music search based on melody imagination or to perform a music search based on a base meter on the display 122 in order to retrieve music.

The BCI-based music search apparatus 100 determines partial brain signal data having musical significance from the received brain signal data 210 (S120). Musically, a bar is the smallest unit of a musical piece, and it is known that two bars form a single motif. A motif is the smallest unit of a melody. It is known that two motifs (four bars) form a small passage (phrase) and two small passages form a large passage, which usually includes eight bars. Accordingly, in the present specification, to have musical significance, brain signal having length data a corresponding to a motif (two bars) or longer, which is the minimum length forming a melody, is determined as the partial b brain signal data in order to retrieve similar music.

To determine the partial brain signal data having musical significance, the BCI-based music search apparatus 100 may measure the length of the received brain signal data, and may request a new brain signal to be provided when the length of the received brain signal data is less than six seconds. For example, a grave tempo, which is known to be the slowest in music, has a tempo of 40 bpm. Accordingly, for example, the BCI-based music search apparatus 100 may request brain signal data based on an at least six-second brain signal as minimum partial brain signal data for retrieving similar music on the basis of four-beat music in the grave tempo.

In another embodiment, the BCI-based music search apparatus 100 may determine partial brain signal data corresponding to a motif on the basis of an event-related potential (ERP) peak envelope and a delta band peak envelope obtained from the brain signal data of the subject.

In an embodiment, the ERP peak envelope may be obtained on the basis of a brain signal measured in superior temporal gyrus (BA 27), and the delta band peak envelope may be obtained on the basis of a brain signal measured in a superior frontal gyrus (BA 10). The peak envelopes refer to signals obtained by connecting the peaks of brain signals as shown in FIG. 4.

Among the brain signals, a delta band may be extracted from a region of 0.5 to 3 Hz, a beta band may be extracted from a region of 12 to 30 Hz, and an ERP may be extracted from a region of 1 to 30 Hz.

A method for the BCI-based music search apparatus 100 to determine a beat according to an embodiment of the present disclosure is described with reference to FIG. 5.

Figure 5:
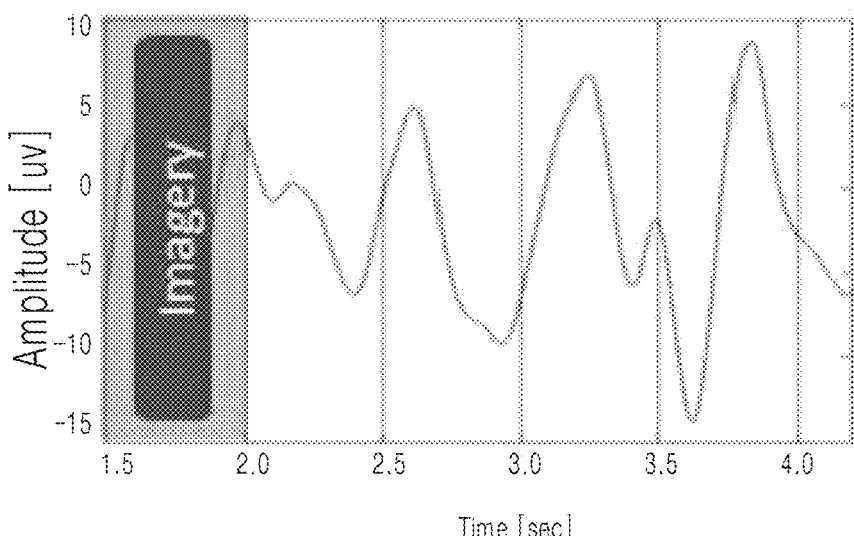
FIG. 5 illustrates a method for determining a beat from brain signal data according to an embodiment of the present disclosure.

In an embodiment, the BCI-based music search apparatus 100 may obtain an ERP peak envelope as shown in FIG. 5 on the basis of a brain signal measured in a subject's superior temporal gyrus (BA 27), and may determine a beat of a melody imagined by the subject from the ERP peak envelope. The BCI-based music search apparatus 100 may determine a point of brain signal data which a low point of the ERP peak envelope is positioned as the start point of the beat.

For example, when determining that the ERP peak envelope obtained on the basis of the brain signal measured while the subject imagines the melody is as shown in FIG. 5 and has a period of 2 Hz, the BCI-based music search apparatus 100 may determine that one beat of the melody imagined by the subject has a length of 500 ms (120 bpm).

When a clear frequency is not seen in the ERP peak envelope obtained on the basis of the brain signal measured while the subject imagines the melody, the BCI-based music search apparatus 100 may determine a frequency for determining the beat of the imagined melody in view of the significance of each frequency band component.

In an embodiment, the BCI-based music search apparatus 100 may store reference brain signal data obtained from the subject while the subject listens to music with a preset beat and meter (e.g., a 4/4 beat and 120 bpm) as a database in advance, and may compare the brain signal data obtained while the melody is imagined with the reference brain signal data, thereby determining a frequency region in which a power spectrum is increased as the frequency for determining the beat of the imagined melody. When there is no significantly increasing frequency band, the beat and meter (4/4 beat and 120 bpm) of the music on which the reference brain signal data is based may be obtained as the beat and meter of the imagined melody.

In another embodiment, among a plurality of frequency bands obtained through frequency analysis of the ERP peak envelope of brain signal data, the lowest frequency band among frequencies of a preset reference or higher or a fundamental frequency band of frequency bands having a power in a certain range or higher among the frequencies of the preset reference or higher may be determined as the frequency for determining the beat of the imagined melody.

A method for the BCI-based music search apparatus 100 to determine a meter according to an embodiment of the present disclosure is described with reference to FIG. 6.

Figure 6:
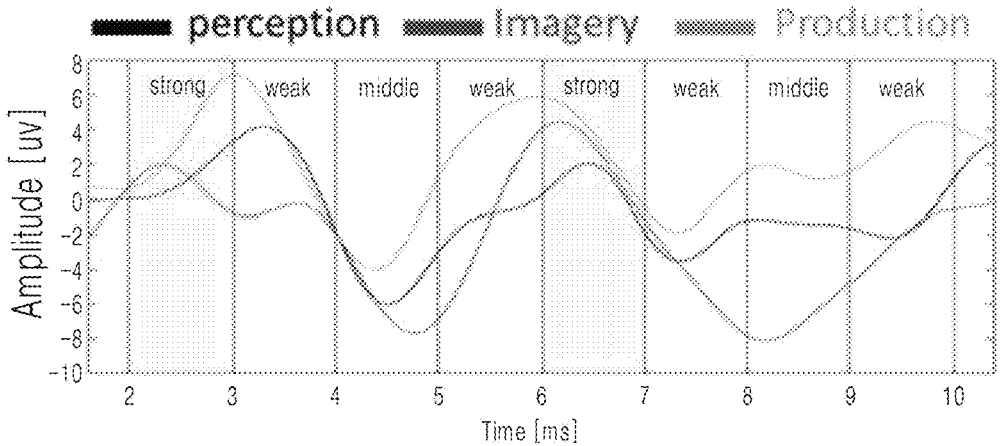
FIG. 6 illustrates a method for determining a meter from brain signal data according to an embodiment of the present disclosure.

FIG. 6 illustrates experimental results, which are the delta band peak envelope (perception) of a brain signal measured while a subject listens to music, the delta band peak envelope (imagery) of a brain signal measured while the subject imagines a melody with the same meter as the music the subject listened to, and the delta band peak (production) of a brain signal measured while the subject sings the melody with the same meter as the music the subject listened to. Through this experiment, the inventors have identified that the meter of the imagined melody may be determined on the basis of the delta peak envelopes of the subject.

In an embodiment, the BCI-based music search apparatus 100 may determine a point of brain signal data at which a high point of the delta band peak envelope obtained on the basis of the brain signal measured in the superior temporal gyrus (BA 10) while the subject imagines the melody is positioned as the start point of the meter, and may determine the meter in view of the previously determined beat.

For example, when one beat is determined to have a length of 500 ms as shown in FIG. 5 and the delta band peak envelope (imagery) of the brain signal measured while the subject imagines the melody has a period of two seconds (0.5 Hz) as shown in FIG. 6, four beats each having a length of 500 ms may be formed for a time of two seconds, thus determining the meter as a 4/4 beat.

Here, the point of the brain signal data at which the high point of the delta band peak envelope is positioned may be determined as the start point of the meter, brain signal data corresponding to one motif from the start point of the meter may be determined as partial brain signal data (S120), and a melodic contour may be determined on the basis of the partial brain signal data.

A method for the BCI-based music search apparatus 100 to estimate a melodic contour (S130) according to an embodiment of the present disclosure is described with reference to FIG. 7.

Figure 7:
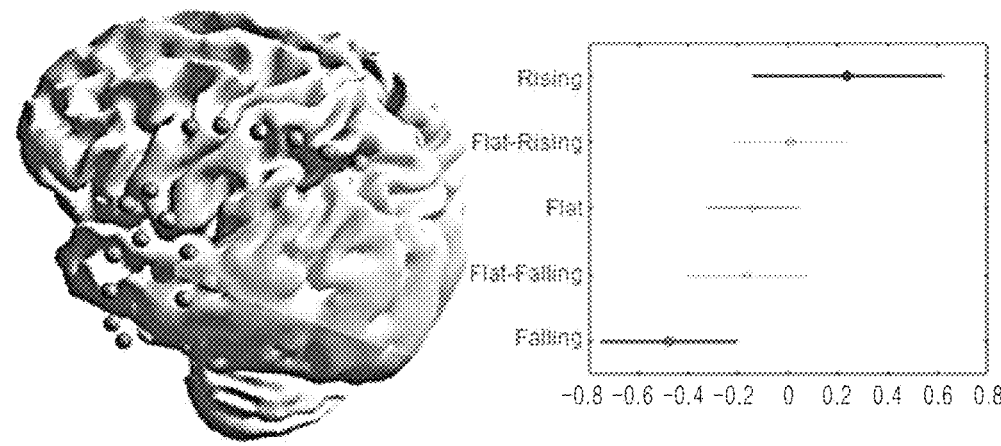
FIG. 7 illustrates a method for determining a melodic contour from brain signal data according to an embodiment of the present disclosure.

FIG. 7 illustrates an experimental result of analyzing a correlation between brain signals measured in a high gamma band region after allowing subjects to imagine melodies of respective melodic contours (rising, flat-rising, flat, flat-falling, and falling). That is, brain signals of subjects imagining specific melodic contours have been found to have a correlation with each other and to be distinguishable from brain signals of subjects imagining different melodic contours.

In an embodiment, the BCI-based music search apparatus 100 may divide pieces of brain signal data of reference subjects imagining the respective melodic contours into groups according to each melodic contour, may compare a feature of pieces of brain signal data of each melodic contour group with brain signal data measured while a subject imagines a melody, thereby determining the melodic contour of the melody imagined by the subject. Comparing brain signal data may be based on the amplitude of a brain signal, FFT power, and correlation analysis. Here, brain signal data to be compared between the reference subjects and the subject may be the aforementioned partial brain signal data, that is, the brain signal data corresponding to the motif.

In another embodiment, the BCI-based music search apparatus 100 may estimate the melodic contour of the melody by inputting the partial brain signal data into a machine learning-based learning model. The learning model may be a learning model trained with training brain signal data obtained from a plurality of reference subjects listening to music corresponding to a preset melodic contour label as training data, and the data input to the learning model may include at least one of the amplitude of a brain signal of the training brain signal data, a preset band power amplitude, ERP, brain connectivity, and FFT power.

The machine learning-based learning models may include a neural network with a CNN, region-based CNN (R-CNN), convolutional recursive neural network (C-RNN), fast R-CNN, faster R-CNN, region-based fully convolutional network (R-FCN), You Only Look Once (YOLO), or single shot multibox detector (SSD) structure.

The learning model may be configured in hardware, software, or a combination of hardware and software, and when the learning model is partially or entirely configured in software, one or more instructions forming the learning model may be stored in a memory.

In an embodiment, the BCI-based music search apparatus 100 may use a brain signal measured in an anterior temporal gyrus of the subject to estimate the melodic contour.

A method for the BCI-based music search apparatus 100 or the search apparatus 300 to retrieve music on the basis of a melodic contour or meter information according to an embodiment of the present disclosure is described with reference to FIG. 8. Although the search apparatus 300 performs a music search in the following description, the BCI-based music search apparatus 100 may perform a music search as described above.

The search apparatus 300 may retrieve music having same or the similar melodic contour in a music information database classified in advance according to a melodic contour on the basis of a melodic contour transmitted from the BCI-based music search apparatus 100, and may transmit at least one piece of music streaming data in a retrieved music list or among retrieved pieces of music to the BCI-based music search apparatus 100 as a result of the search. The BCI-based music search apparatus 100 may provide music retrieved on the basis of a melodic contour to a subject (S140).

In an embodiment, the BCI-based music search apparatus 100 may further provide meter information on a melody imagined by the subject in addition to the melodic contour to the search apparatus 300. The meter information refers to musical information based on a pattern of strength and weakness of music, and may be the length a beat or a meter.

Figure 8:
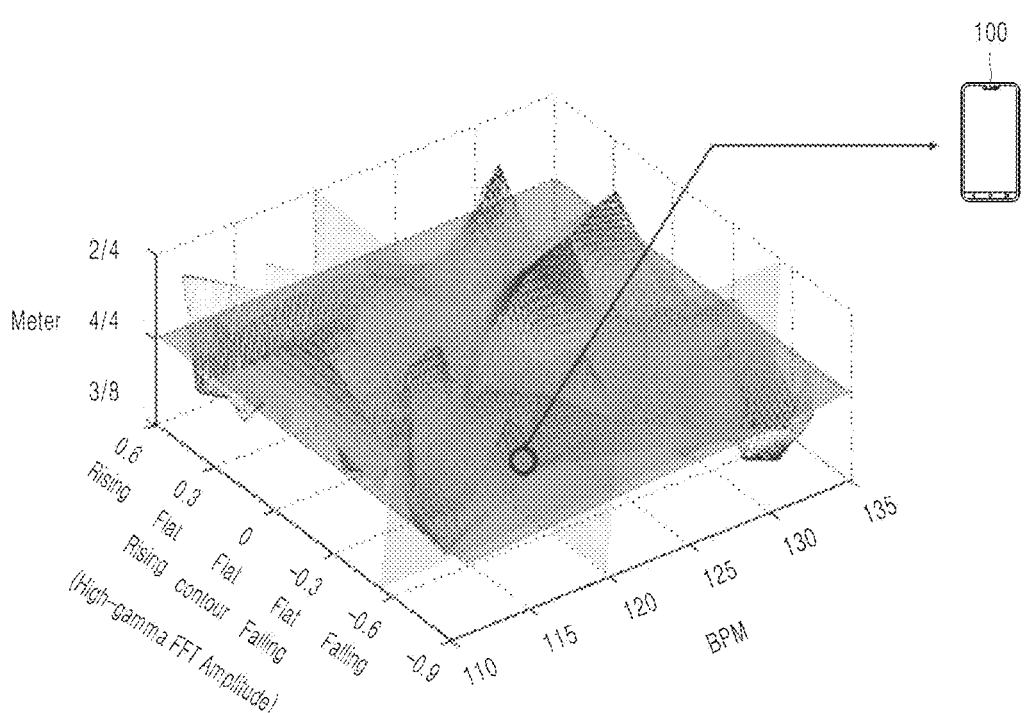
FIG. 8 illustrates a method for retrieving similar music on the basis of an imagined melody according to an embodiment of the present disclosure.

For example, as shown in FIG. 8, the search apparatus may analyze pieces of music by beat (bpm), meter, and melodic contour to store the same in a database, may determine at least one piece of music having a beat (bpm), a meter, and a melodic contour requested by the BCI-based music search apparatus 100, and may transmit a search result to the BCI-based music search apparatus 100.

Figure 9:
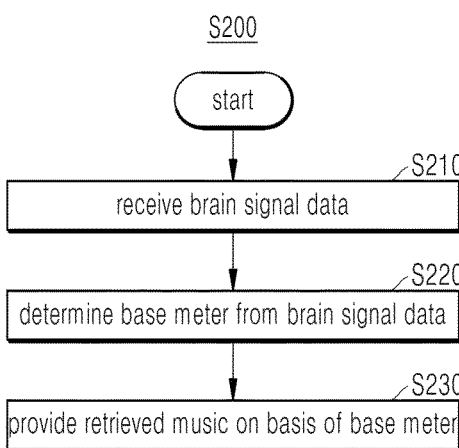
FIG. 9 is a flowchart illustrating a method for retrieving music from brain signal data on the basis of a base meter according to an embodiment of the present disclosure.

A BCI-based music search method of the BCI-based music search 100 according apparatus to another embodiment of the present disclosure is described with reference to FIG. 9.

In an embodiment, the BCI-based music search apparatus 100 may receive brain signal data measured without a subject imagining music (S210), may determine a base meter included in the base of a brain signal on which the brain signal data is based (S220), and may provide music retrieved on the basis of the base meter to the subject (S230).

The inventors of the present disclosure found that a brain signal measured in a specific band after applying an external stimulus to a subject has a certain meter (period and beat), and a brain signal measured in the specific band even when the external stimulus disappears or no external stimulus is applied has a certain meter In (base meter). In a case of an electroencephalogram, the brain signal may be a brain signal measured in a delta band of 0.5 to 3 Hz, in a beta band of 12 to 30 Hz, and in an ERP of 1 to 30 Hz. In the specification according to the present disclosure, this is referred to as a base meter.

In an embodiment, the BCI-based music search apparatus 100 may determine the base meter on the basis of peak values in a preset frequency band from the brain signal data.

Figure 10:
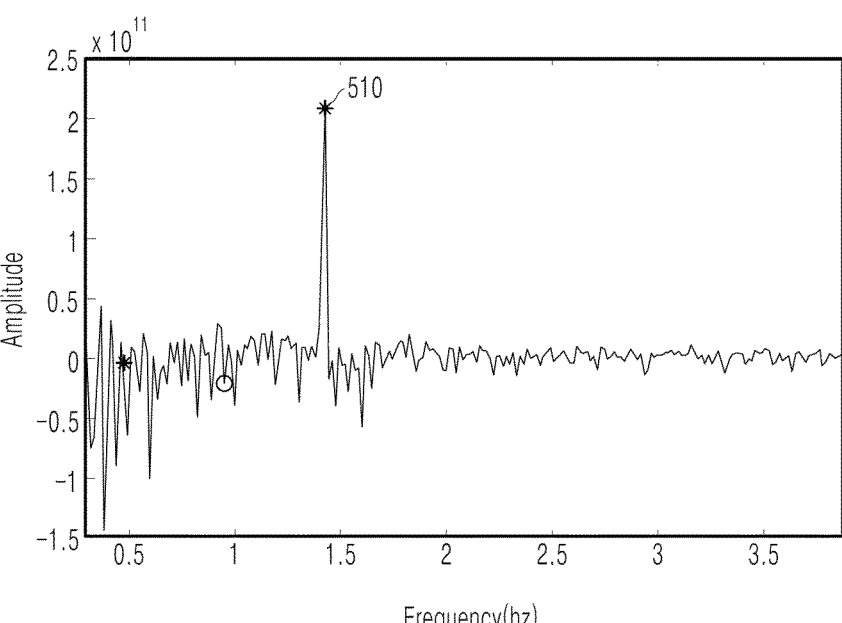
FIG. 10 illustrates a method for determining a base meter from brain signal data according to an embodiment of the present disclosure.

For example, when the base meter is determined on the basis of the frequency band of a brain signal measured in a specific band as shown in FIG. 10, a specific meter of 1.42 Hz (85 BPM) 510 may be identified.

Figure 11:
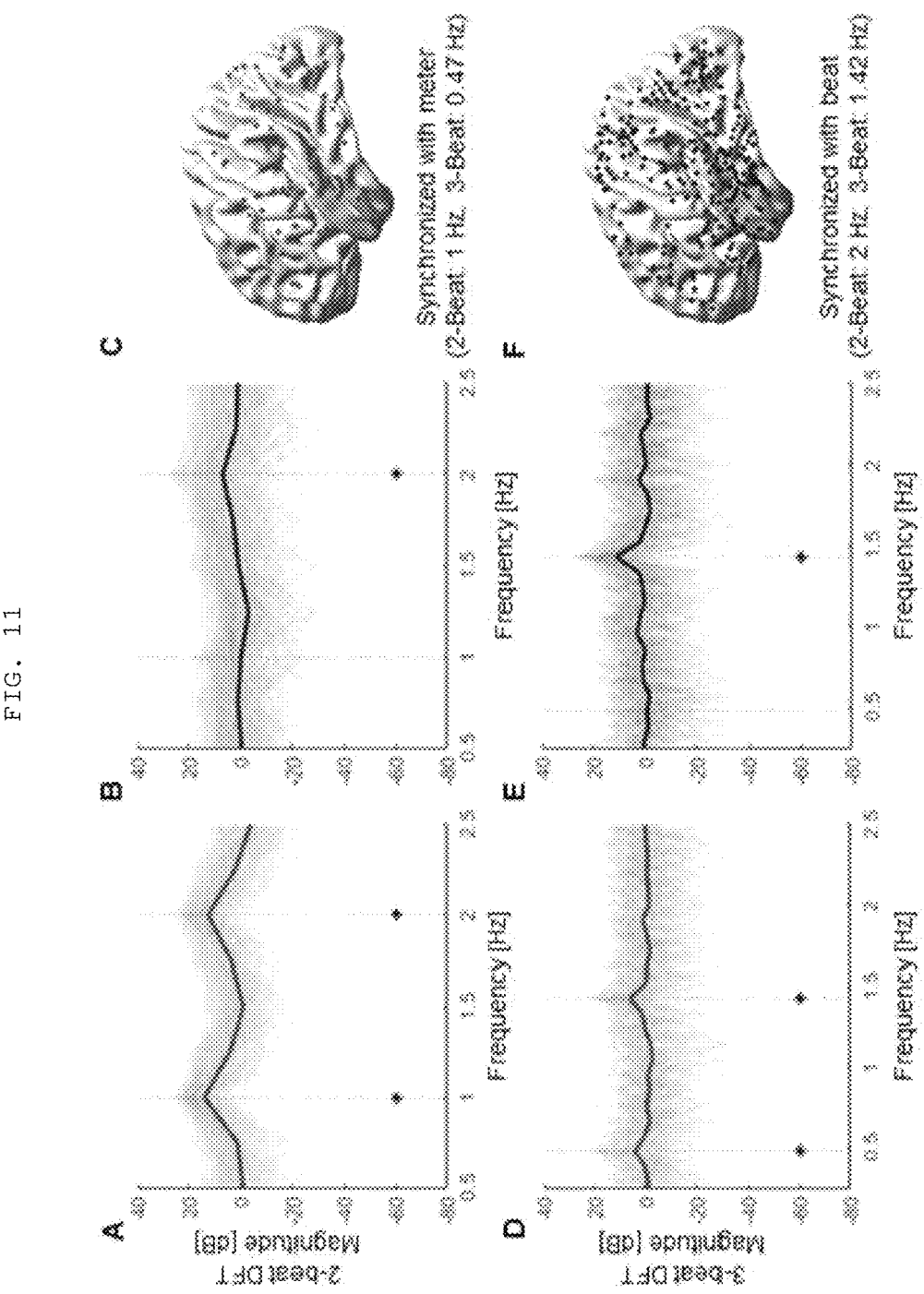
FIG. 11 illustrates a method retrieving similar music on the basis of a base meter according to an embodiment of the present disclosure.

A, B, D, and E of FIG. 11 show results of an experiment of identifying a region synchronized with an external meter sense and a response thereto. As a result of the experiment, the cortical region of the brain responsible for the sense of meter and the current subject's synchronized meter are identified, and the base meter is identified on the basis of the region and the method presented in the experiment.

A, B, D, and E of FIG. 11 the difference between the discrete Fourier transform (DFT) values of brain signals (EcoG) in a stimulation section and a pre-stimulation section in an experimental environment having the stimulation section and the pre-stimulation section as in FIG. 12, thus identifying the current meter state of the subject (* means a p-value less than 0.01). This result is the result of DFT analysis to identify which frequency significantly increases in the stimulation section compared to the pre-stimulation section.

Figure 13:
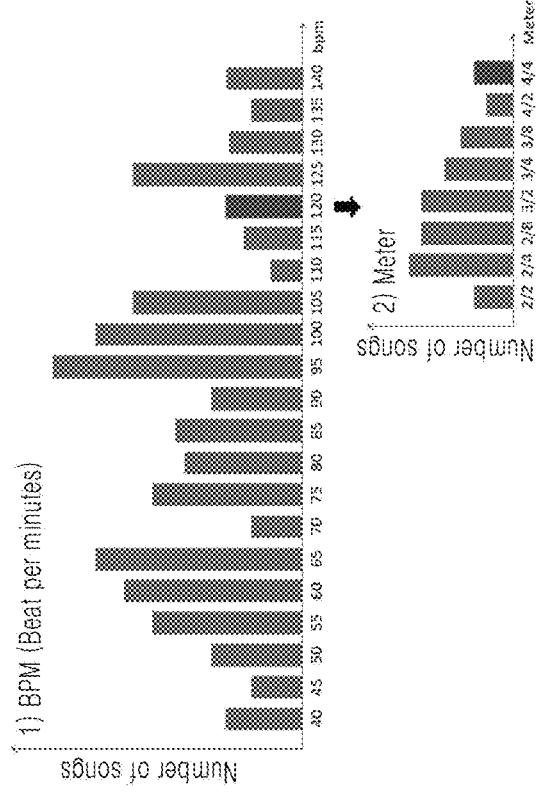
FIG. 13 illustrates a music information database classified according to beat (BPM) and meter for retrieving music on the basis of a base meter according to an embodiment of the present disclosure.

A method for the BCI-based music search apparatus 100 or the search apparatus 300 to retrieve music on the basis of a base meter according to another embodiment of the present disclosure is described with reference to FIG. 13. Although the search apparatus 300 performs a music search in the following description, the BCI-based music search apparatus 100 may perform a music search as described above.

The search apparatus 300 may retrieve music having the same or similar beat and meter in a music information database classified in advance according to a beat and a meter on the basis of a base meter transmitted from the BCI-based music search apparatus 100, and may transmit at least one piece of music streaming data in a retrieved music list or among retrieved pieces of music to the BCI-based music search apparatus 100 as a result of the search. The BCI-based music search apparatus 100 may provide retrieved music to a subject (S230).

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Further, the computer may include a processor of each device.

The computer program may be specifically designed for the present disclosure, and may be known to and used by those skilled in computer software fields. Examples of the computer program may include machine language code generated by a compiler and high-level language code executable by a computer through an interpreter or the like.

In the specification (particularly, in the claims) of the present disclosure, the term "the" and the indication term similar thereto may correspond to both the singular and the plural. When the present disclosure includes a range, the present disclosure includes an disclosure to which an individual value belonging to the range is applied (unless there is description against it), which means that the detailed description of the present disclosure includes the individual value within the range.

Unless there is clear description of the order of steps included in the method according to the present disclosure or unless indicated otherwise, the steps can be conducted in appropriate order. The present disclosure is not necessarily limited to the order of the steps described therein. All examples or example terms (for example, "etc.") may be simply used to describe the present disclosure in detail but do not limit the scope of the present disclosure unless the scope of the present disclosure is limited by the claims. Further, those skilled in the art can identify that various modifications, combinations, and changes can be configured according to design conditions and factors within the range of appended claims and equivalents thereof.

Accordingly, the spirit and scope of the present disclosure should not be limited or determined by the above-described embodiments, and it should be noted that not only the claims which will be described below but also their equivalents fall within the spirit and scope of the present disclosure.

The present disclosure is the result of research supported by the Samsung Science & Technology Foundation.

Research support: Samsung Science & Technology Foundation

Project No.: SRFC-IT1902-08

Project Title: Development of BCI-musicing system through decoding of brain signal

The invention claimed is:

1. A brain-computer interface (BCI)-based music inferring method in which at least part of each operation is performed by a processor, the method comprising:
   receiving brain signal data of a subject imagining a melody;
   obtaining an event-related potential (ERP) peak envelope and a delta band peak envelope by processing the brain signal data; and
   estimating a melodic contour of the melody on a basis of the ERP peak envelope and the delta band envelope,
   wherein the estimating of the melodic contour of the melody comprises estimating the melodic contour of the melody by inputting partial brain signal data into a machine learning-based learning model, and
   wherein the learning model is a learning model trained with training brain signal data obtained from a plurality of training subjects listening to music corresponding to a preset melodic contour label as training data.

2. The BCI-based music inferring method of claim 1, further comprising:
   measuring a length of the brain signal data; and
   identifying whether the length of the brain signal data is six seconds or longer.

3. The BCI-based music inferring method of claim 1, comprising:
   determining partial brain signal data having musical significance having a length corresponding to at least two bars from the brain signal data;
   determining meter information about the melody on a basis of the brain signal data corresponding to the partial brain signal data; and
   retrieving music on a basis of the meter information about the melody and the melodic contour of the melody.

4. The BCI-based music inferring method of claim 3, wherein the determining of the meter information further comprises determining a beat and a meter of the melody on a basis of the brain signal data.

5. The BCI-based music inferring method of claim 4, wherein the determining of the beat and the meter comprises:
   comparing reference brain signal data obtained from the subject while the subject listens to music having a preset beat and meter with the brain signal data;

determining a frequency region in which a power spectrum is increased from the brain signal data on a basis of comparison with the reference brain signal data; and
   determining the beat and the meter of the melody imagined by the subject on a basis of the frequency region in which the power spectrum is increased.

6. The BCI-based music inferring method of claim 4, wherein the estimating of the melodic contour comprises:
   determining the melodic contour based on the partial brain signal data corresponding to a motif on a basis of the ERP peak envelope and the delta band peak envelope.

7. The BCI-based music inferring method of claim 6, wherein the determining of the partial brain signal data corresponding to the motif comprises:
   determining a point of the brain signal data at which a low point of the ERP peak envelope is positioned as a start point of the beat;
   determining a point of the brain signal data at which a high point of the delta band peak envelope is positioned as a start point of the meter; and
   determining a position of the brain signal data corresponding to a bar on a basis of the start point of the meter and the start point of the beat, and determining the partial brain signal data corresponding to the motif on a basis of the position of the brain signal data corresponding to the bar.

8. The BCI-based music inferring method of claim 1, wherein the training data is based on at least one feature among a preset band power amplitude, an event-related potential (ERP), and brain connectivity from the training brain signal data obtained from the plurality of training subjects.

9. A brain-computer interface (BCI)-based music inferring method in which at least part of each operation is performed by a processor, the method comprising:
   receiving brain signal data of a subject;
   when the received brain signal data is brain signal data of a subject imagining a melody, determining partial brain signal data having musical significance from the brain signal data, and estimating a melodic contour of the melody based on the partial brain signal data; and
   when the received brain signal data is brain signal data of a subject measured without musical imagination, determining base meter information from the brain signal data,
   wherein the determining of the partial brain signal data comprises obtaining an event-related potential (ERP) peak envelope and a delta band peak envelope by processing the brain signal data, and
   wherein the estimating of the melodic contour comprises determining the melodic contour based on the partial brain signal data corresponding to a motif on a basis of the ERP peak envelope and the delta band peak envelope.

10. The BCI-based music inferring method of claim 9, wherein the determining of the base meter information comprises determining the base meter information on a basis of peak values in a preset frequency band from the brain signal data.

11. A brain-computer interface (BCI)-based music inferring apparatus comprising:
   a processor; and
   a memory configured to be electrically connected to the processor and to store at least one code performed by the processor, wherein the memory is configured to store a code which, when executed by the processor, causes the processor to:

receive brain signal data of a subject imagining a melody;

obtain an event-related potential (ERP) peak envelope and a delta band peak envelope by processing the brain signal data;

determine partial brain signal data having musical significance from the brain signal data using the ERP peak envelope and the delta band peak envelope; and estimate a melodic contour of the melody on a basis of the partial brain signal data, and wherein the memory is configured to cause the processor to estimate the melodic contour of the melody by inputting the partial brain signal data into a machine learning-based learning model, and wherein the learning model is a learning model trained with training brain signal data obtained from at least one second subject listening to music corresponding to a preset melodic contour label as training data.

12. The BCI-based music inferring apparatus of claim 11, wherein the memory is configured to further store a code which causes the processor to measure a length of the brain signal data; and to identify whether the length of the brain signal data is six seconds or longer.

13. The BCI-based music inferring apparatus of claim 12, wherein the memory is configured to:

further store a code which causes the processor to determine the partial brain signal data having musical significance having a length corresponding to at least two bars from the brain signal data;

determine meter information about the melody on a basis of the brain signal data corresponding to the partial brain signal data; and retrieve music on a basis of the meter information about the melody and the melodic contour of the melody.

14. The BCI-based music inferring apparatus of claim 13, wherein the memory is configured to further store a code which causes the processor to determine a beat and a meter of the melody on a basis of the brain signal data.

15. The BCI-based music inferring apparatus of claim 14, wherein the memory is configured to further store a code which causes the processor to determine a frequency region in which a power spectrum is increased from the brain signal data on a basis of a result of comparing reference brain signal data obtained from at least one first subject while the first subject listens to music having a preset beat and meter with the brain signal data, and to determine the beat and the meter of the melody imagined by the subject on a basis of the frequency region in which the power spectrum is increased.

16. The BCI-based music inferring apparatus of claim 11, wherein the memory is configured to further store a code which causes the processor to determine the melodic contour based on the partial brain signal data corresponding to a motif on a basis of the ERP peak envelope and the delta band peak envelope.

17. The BCI-based music inferring apparatus of claim 16, wherein the memory is configured to:

further store a code which causes the processor to determine a point of the brain signal data at which a high point of the ERP peak envelope is positioned as a start point of the meter;

determine a point of the brain signal data at which a low point of the delta band peak envelope is positioned as a start point of each beat;

determine a position of the brain signal data corresponding to a bar on a basis of the start point of the meter and the start point of each beat; and determine the partial brain signal data corresponding to the motif on a basis of the position of the brain signal data corresponding to the bar.

18. The BCI-based music inferring apparatus of claim 11, wherein the training data is based on at least one feature among a preset band power amplitude, an event-related potential (ERP), and brain connectivity from the training brain signal data obtained from the second subject.

* * * * *